United States Patent [19]
Radomski

[11] Patent Number: 5,552,651
[45] Date of Patent: Sep. 3, 1996

[54] ALTERNATING CURRENT GENERATOR

[75] Inventor: Thomas A. Radomski, Shelby Township, Mich.

[73] Assignee: General Motors Corporation, Detroit, Mich.

[21] Appl. No.: 497,848

[22] Filed: Jul. 3, 1995

[51] Int. Cl.$^6$ ................................................ H02K 1/22
[52] U.S. Cl. ...................... 310/181; 310/263; 310/218
[58] Field of Search .............................. 310/181, 263, 310/218, 156; 148/101; 335/234

[56] References Cited

U.S. PATENT DOCUMENTS

| | | | |
|---|---|---|---|
| 3,869,626 | 3/1975 | Puttock et al. | 310/152 |
| 4,703,212 | 10/1987 | Aboukrat et al. | 310/218 |
| 4,980,595 | 12/1990 | Arora | 310/263 |
| 5,177,391 | 1/1993 | Kusase | 310/263 |
| 5,483,116 | 1/1996 | Kuase et al. | 310/263 |

Primary Examiner—Steven L. Stephan
Assistant Examiner—Jonathan Link
Attorney, Agent, or Firm—Vincent A. Cichosz

[57] ABSTRACT

An automotive alternator has a rotor including a first single coil Lundell portion and a second permanent magnet portion. Permanent magnet poles are axially aligned in spaced adjacency with the fingers of the magnetic members of the Lundell portion of the machine. The current through the field coil of the Lundell portion is controllable in magnitude and direction to control the output of the machine.

2 Claims, 4 Drawing Sheets

ALTERNATING CURRENT GENERATOR

BACKGROUND

The present invention is directed toward alternating current generators. More particularly, the present invention is concerned with high output automotive alternators.

Automotive alternators are known utilizing both field coil and permanent magnet fluxes coupled to a stator coil, hereafter referred to as hybrid alternators. For example, U.S. Pat. Nos. 4,882,515 (hereafter '515) and 4,959,577 (hereafter '577), both to Radomski and both assigned to the assignee of the present invention disclose two such hybrid alternators based upon a Lundell rotor structure having a unitary field coil. Lundell structures are notorious for undesirable flux leakage paths during power generation, thereby resulting in less flux coupling through the stator windings and reduced efficiency. The structure disclosed in '577 reduces such leakage paths and increases stator flux, however it has magnetic flux contribution limitations due to magnet size and retention limitations. The structure disclosed in '515 can successfully accommodate more permanent magnet material into its structure but still exhibits the undesirable flux leakage paths characteristic of Lundell structures. However, hybrid alternators of the variety disclosed in the two patents to Radomski exhibit the desirable characteristic of low stator iron losses due to substantial magnet flux shunting through the rotor structure.

Another variety of hybrid alternator is disclosed in U.S. Pat. No. 5,397,975 (hereafter '975) to Syverson and assigned to Ecoair Corporation. As taught by the disclosure of '975, such a machine has a salient, multi-pole, field coil controlled rotor portion with each pole supporting respective windings of the field coil and a permanent magnet portion in longitudinally spaced relationship to the field coil controlled rotor portion. The permanent magnet portion maintains a permanent magnet flux across an air gap between magnet poles and one portion of a divided stator structure, thereby coupling significant magnet flux through the stator structure. Such a spaced arrangement disadvantageously exhibits significant iron losses due to the substantial magnet flux that is continually coupled through the stator iron. Furthermore, the field coil controlled rotor portion having multiple winding sets characteristically exhibits greater power dissipation than unitary field coil winding configuration such as practiced with Lundell variety rotor structures, and requires each winding set to develop the magneto-motive force (mmf) necessary to drive the flux across the air gap thus requiring greater field currents. Additionally, the salient pole construction of Syverson has some drawbacks relative to coil retention at rotor speeds typically encountered in an automotive application and higher inertia due to the multiple windings.

SUMMARY

Therefore, the present invention provides an alternator having a higher power output for a given rotor inertia. This is accomplished in an alternating current generator including a housing, a stator and output winding, and a rotor having a field coil controlled Lundell portion and an adjacently placed permanent magnet flux portion. The Lundell portion of the machine has opposing claw-pole members with interleaved fingers. The tips of the fingers of a first claw-pole member extend to the back of the fingers of the second claw-pole member thereby aligning substantially in a common plane therewith. The permanent magnet portion includes a permanent magnet carrier formed of magnetic material, adjacent the second claw-pole member and having a plurality of permanent magnet poles at an outer periphery thereof. Each of the permanent magnet poles is axially aligned with one of the claw-pole fingers such that an axial space exists therebetween. The permanent magnet poles alternate polarity, adjacent permanent magnet poles having opposite magnetic polarity with adjacent permanent magnet poles having opposite magnetic polarity.

A single field coil positioned between the pair of claw-pole members is bi-directionally energizable to establish first and second magnetic polarities of the claw-pole members such that one energization direction establishes like polarity between each claw-pole finger and the respective axially adjacent permanent magnet pole, and the other energization direction establishes dissimilar polarity between each claw-pole finger and the respective axially adjacent permanent magnet pole.

In accordance with one preferred aspect of the invention, all permanent magnet poles comprise either a radially magnetized permanent magnet or a radially magnetized portion of the magnetic material of the carrier.

In accordance with another preferred aspect of the invention, permanent magnet poles alternate between radially magnetized permanent magnets of like polarity and a portion of the permanent magnet carrier at the outer periphery thereof.

The permanent magnet carrier in one preferred configuration abuts the second claw-pole member, and in another preferred configuration is magnetically isolated from the shaft and spaced from the second claw-pole member.

In accordance with another preferred aspect of the invention, the permanent magnet carrier has a main hub portion that is in spaced adjacency with the second claw-pole member, and a rim section at the outer periphery thereof that supports the permanent magnets in extension toward the second claw-pole member to thereby provide gaps between the second claw-pole member and the permanent magnets that are less than the gap between the main hub portion and the second claw-pole member.

DETAILED DESCRIPTION

Figure 4:
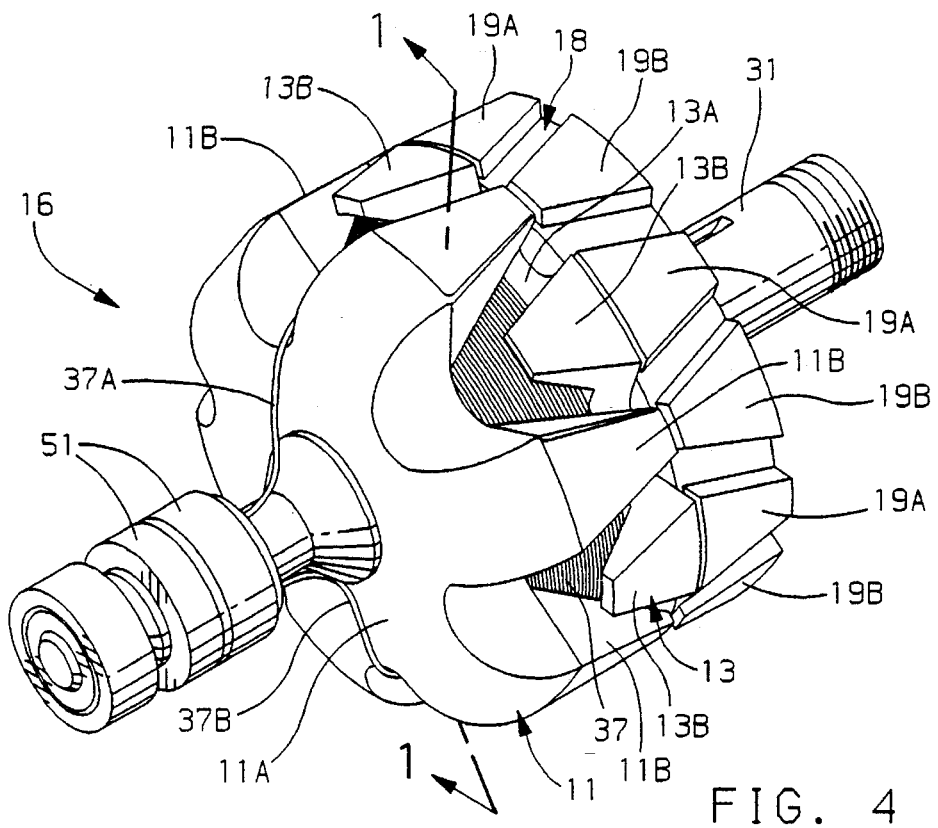
FIG. 4 is an isometric view of a first rotor embodying various features of the present invention.

Referring first to FIG. 4, a first rotor embodying certain features of the present invention is generally designated by the numeral 16. Rotor shaft 31 has affixed thereto a pair of claw-pole members 11 and 13. Claw-pole member 11 is referred to herein as the first claw-pole member and claw-pole member 13 is referred to herein as the second claw-pole member. Each claw-pole member is characterized by a respective hub portion 11A and 13A and a respective plurality of circumferentially spaced claw-pole fingers 11B and 13B. Each claw-pole finger is joined to a respective hub, extends axially in one direction therefrom, and terminates at a distal end. The pair of claw-pole members 11 and 13 are aligned such that the respective claw-pole fingers of each interleave with those of the other. The respective geometries of the first and second claw-pole members are such that the distal ends of the claw-pole fingers 11B of the first claw-pole member 11 terminate substantially in a plane normal to the rotor shaft axis common with the proximal ends of the claw-pole fingers 13B of the second claw-pole member 13 for reasons more apparent at a later point. Each claw pole member is formed of magnetic material such as steel. Located between the claw-pole members 11 and 13, and radially inward of the claw-pole fingers, is a field coil 37. Also affixed to the shaft 31 is a pair of conventional slip rings 51 for coupling field coil 37 to a bi-directional current source (not shown) to thereby establish the desired polarity of the claw-pole members. This portion of the rotor may generally be referred to herein as the field coil flux portion.

In the present exemplary embodiments, the second claw-pole member 13 has an overall axial dimension slightly over one-half that of the first claw-pole member 11, the geometries cooperating to provide for the distal ends of the claw-pole fingers 11B extending substantially to the back surface of the second claw-pole member 13. The tips of the claw-pole fingers 11B, therefore, are substantially in the desired planar alignment with proximal ends of the claw-pole fingers 13B. This geometry may be seen more clearly in the sectional view of FIG. 1.

In accord with a first preferred embodiment of the present invention, affixed to the shaft 31 is a permanent magnet carrier 18 (hereafter PM carrier) formed of a magnetic material such as steel. The rotor structure illustrated in FIG. 4 shows a first preferred PM carrier 18 wherein a plurality of permanent magnets 19A and 19B are magnetized radially and secured to the outer periphery of the PM carrier 18 such as by a suitable structural adhesive. Additionally, if high speed operation is envisioned, conventional filament banding may be employed for further retention integrity. Any of a variety of permanent magnet material may be used for permanent magnets 19A and 19B such as neodymium-iron, samarium-cobalt, or ferrite. Each of the permanent magnets 19B is axially aligned with one of the plurality of claw-pole fingers 11B, and each of the permanent magnets 19A is axially aligned with one of the plurality of claw-pole fingers 13B. The polarities of the permanent magnets alternate such that adjacent magnets are of opposite polarity. Therefore, it can be appreciated that claw-pole fingers 11B have axially aligned therewith permanent magnets 19B having a first common polarity, and claw-pole fingers 13B have axially aligned therewith permanent magnets 19A having a second common polarity. The permanent magnets 19A and 19B are shown having a substantially trapezoidal shape which provides substantially symmetrical abutting surfaces at the respective PM carrier to claw-pole finger interface. The present trapezoidally shaped permanent magnets 19A and 19B are illustrated herein as an exemplary shape, it being understood that other shapes for the permanent magnets will be apparent to the skilled artisan.

Figure 5:
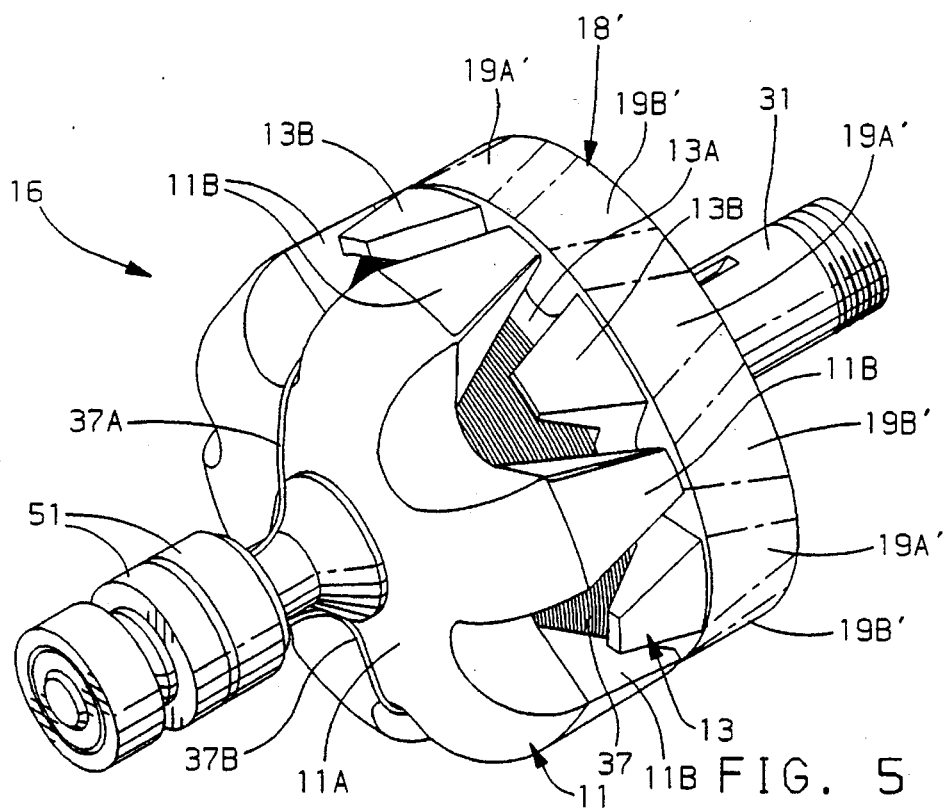
FIG. 5 is an isometric view of a second rotor embodying various features of the present invention.

Referring additionally to FIG. 5 wherein like numerals correspond to like features described with respect to FIG. 4, a second rotor embodying certain features of the present invention is also generally designated by the numeral 16. A second preferred PM carrier 18' includes a plurality of permanently magnetized areas 19A' and 19B' comprising permanently magnetized portions of the PM carrier 18'. Such a PM carder 18' having integral permanently magnetized areas 19A' and 19B' can be manufactured, for example, by selectively patterning the magnetic areas using conventional electromechanical fixtures. Permanent magnets 19A and 19B and permanently magnetized areas 19A' and 19B' are hereafter referred to interchangeably as permanent magnets.

In both FIGS. 4 and 5, permanent magnets, regardless of composition or structure, define permanent magnet poles at the periphery of the carrier. The terminology "permanent magnet poles" is not intended to as being descriptive of the material comprising the poles, rather, of the nature or characteristic of flux emanating therefrom as distinguished from the field coil flux portion. The two permanent magnet carrier structures heretofore described wherein all permanent magnets 19A and 19B comprise either permanent magnet material or permanently magnetized areas of the steel carder are given by way of non-exhaustive example. An alternate structure later described will be seen to have permanent magnet poles comprising permanent magnet material and permanent magnet poles comprising non-magnetized steel at the outer periphery of the permanent magnet carrier.

Figure 1:
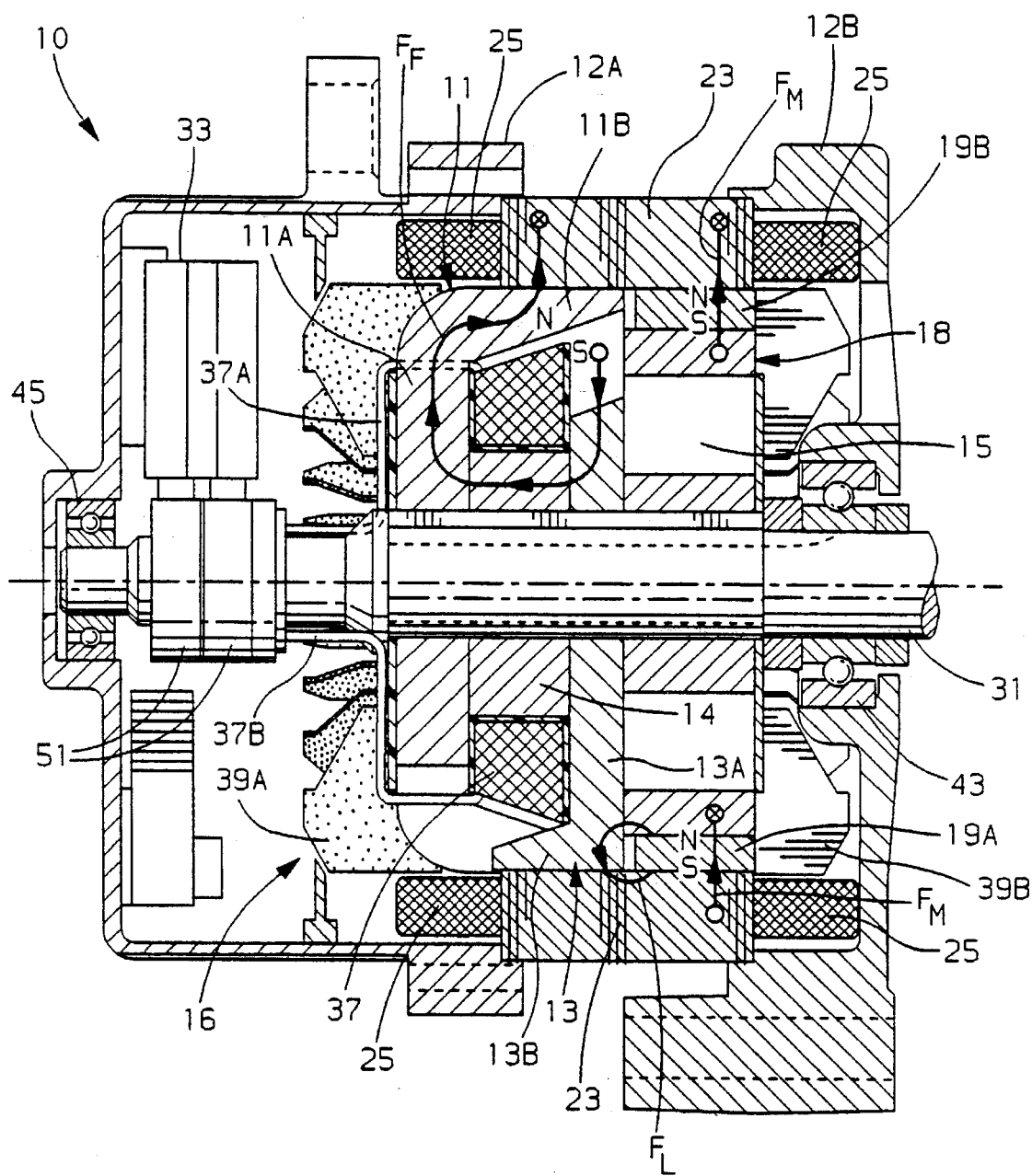
FIG. 1 is a sectional view taken along lines 1—1 of FIG. 4 through an exemplary alternator having one preferred structure and providing flux detail for a field coil energized in a first direction.

Turning now to FIG. 1, a sectional view of an alternator in accord with the present invention is illustrated. The section shown is essentially through two coincident planes represented by section line designated 1—1 in FIG. 4 in order to more completely illustrate certain details of the rotor otherwise obscured with a planar sectional view owing to the symmetry of the rotor. The alternator is generally designated with the numeral 10 in the figure with the rotor structure again being generally designated by the numeral 16. A pair of end frames 12A and 12B provide a housing, support and mounting structure for the alternator. Typically the end frames are comprised of a non-ferrous material such as aluminum and held together by a plurality of through-bolts (not shown) in a well known manner. Each end frame houses a respective bearing 43 and 45 for rotatably supporting the rotor shaft 31. The end frames also cooperate to retain a stator assembly comprising a conventional stacked lamination core 23 and output winding 25 by sandwiching the core therebetween. Conventional slip tings 51 are electrically coupled to field coil leads 37A and 37B and are fixedly secured to the rotor shaft 31 in a conventional manner. In slidable contact with the outer surfaces of the slip rings are conventional brushes shown generally as part of brush assembly 33. At both ends of the rotor 16 are cooling fans 39A and 39B for rotation with the rotor to provide air circulation about and through portions of the rotor and housing.

First and second claw-pole members 11 and 13 are shown as is the field coil 37 interposed therebetween. Conventionally, a core 14 comprising magnetic material such as steel is also interposed between the two claw-pole members and provides an outer mounting diameter for the field coil 37. This core 14 may be a separate piece as illustrated or may be integral with one or both of the claw-pole members. PM carrier 18 is shown with permanent magnets 19A and 19B at the outer periphery thereof. Preferably, PM cartier 18 also includes a number of axial passages 15 therethrough which advantageously reduce inertial mass and provide for air circulation when preferably aligned intermediate the claw-pole fingers 13B. It is apparent from the sectional view of FIG. 1 that PM carder 18 abuts the second claw-pole member 13. Since, as previously described, the tips of the claw-pole fingers 11B of the first claw-pole member 11 are substantially in planar alignment with the back surface of the second claw pole member 13, the permanent magnet 19B illustrated in the portion of the sectional view above the rotor shaft in the figure is adjacent the claw-pole finger 11B of the first claw-pole member 11. Likewise, the permanent magnet 19A illustrated in the portion of the sectional view below the rotor shaft in the figure is adjacent the claw-pole finger 13B of the second claw-pole member 13. Further, it can be seen that the polarities of the two respective permanent magnets 19A and 19B shown sectionally in the figure have opposite polarities. It is here noted that the placement of the magnets 19A axially with respect to the abutting surfaces of the second claw-pole member 13 and the PM carrier 18 preferably provides for a small air gap therebetween to prevent certain undesirable local flux leakage from the magnets adjacent the second claw pole during power generation.

Further with respect to FIG. 1, it is assumed that the alternator is being operated with a field excitation current to establish the indicated polarity of the claw-pole members; that is to say claw-pole fingers 11B have a north (N) magnetic polarity and claw-pole fingers 13B have a south (S) magnetic polarity. Excitation current resulting in such claw-pole polarity is referred to herein as forward excitation or forward field. This establishes magnetically homopolar pairs of axially aligned pole fingers and permanent magnets. Thus, flux at the respective outer surfaces of any pair of axially aligned claw-pole fingers and permanent magnets is in the same direction. This excitation scenario results in field generated flux patterns $F_F$ and permanent magnet generated flux patterns $F_M$ as generally illustrated. Choosing an arbitrary start point of the outer surface (N pole) of the permanent magnet 19B, the permanent magnet flux is seen to essentially leave the permanent magnet 19B, cross the air gap between the rotor and stator, penetrate deeply into the stator core, cross the air gap to an adjacent, opposite polarity permanent magnet, and close the path through the magnetic material of the PM carrier 18 to the south pole of the magnet. Similarly, the flux generated by the field coil 37 is seen to leave the claw-pole finger 11B, cross the air gap between the rotor and stator, proceed deeply into the stator core, cross the air gap to an adjacent, opposite polarity claw-pole finger 13B, and close the path through the magnetic material of the rotor structure including the hub portion 13A, core 14 and hub portion 11A. All pairs of circumferentially adjacent claw-pole fingers and pairs of circumferentially adjacent permanent magnets have respective flux patterns generally following those immediately previously described. Notwithstanding the degree of proximity of the substantial magnetic material of the claw-pole finger 11B to the permanent magnet 19B, very little flux exchange occurs therebetween since the polarity and magnitude of the mmf of the claw-pole finger 11B opposes the adjacent magnet mmf and flux emanating from the outer surface of the permanent magnet 19B (N pole). The pairs of axially aligned claw-pole fingers 11B and magnets 19B exhibit inherently more desirable flux patterns as can be appreciated when examining the polar relationship between the PM carrier 18 in the locality of the permanent magnet 19B (S) and the claw-pole member 13, also (S). The polar opposition that these homopolar localities exhibit serve to advantageously thwart flux leakage between them by directing respective flux to lower reluctance and more desirable paths (i.e. those established by respective circumferentially adjacent poles through the output winding). The adjacent pairs of axially aligned claw-pole fingers 13B and magnets 19A, however, exhibit inherently less desirable flux patterns as can be appreciated by similar examination of the polar relationship between the PM carder 18 in the locality of the permanent magnet 19A (N) and the claw-pole member 13 (S). The polar attraction that these abutting dipolar localities exhibit serve to aid flux leakage $F_L$ into non-beneficial paths (i.e. shunting through PM carder 18, claw-pole finger 13B and stator core 23).

Figure 2:
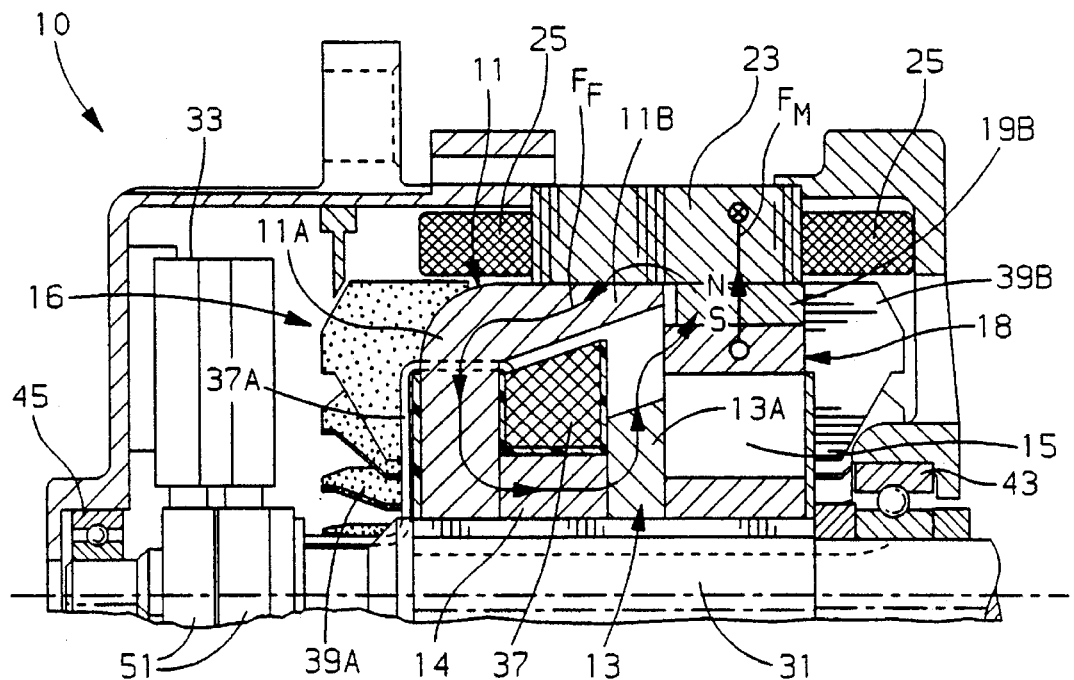
FIG. 2 is a partial sectional view through an alternator embodying the present invention and providing flux detail for a substantially unenergized field coil.
Figure 3:
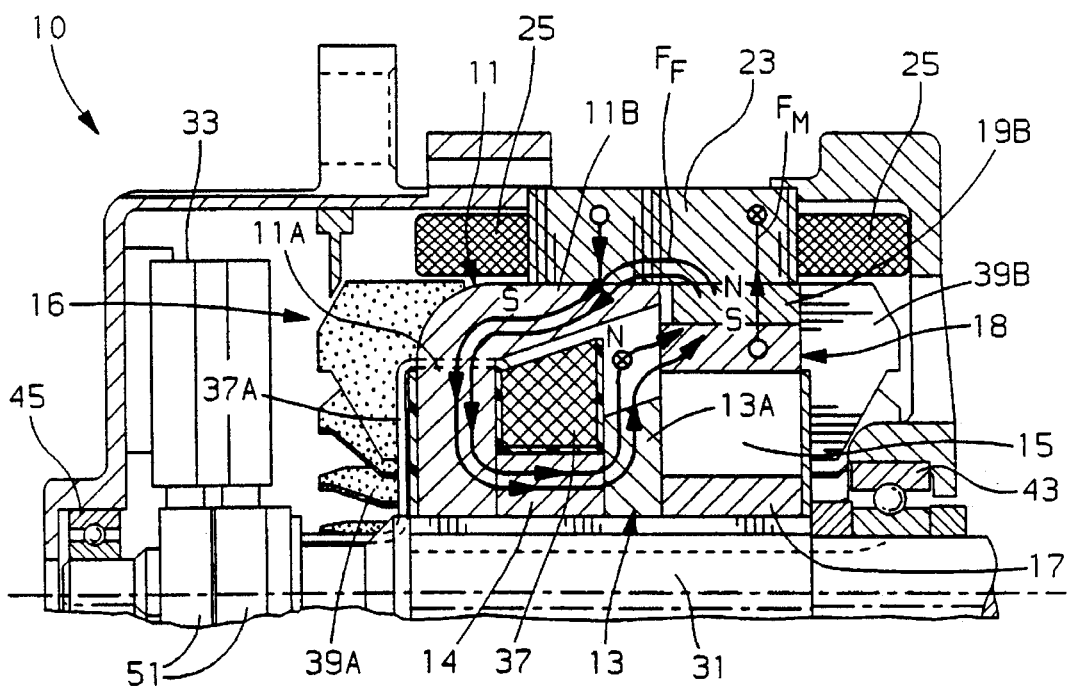
FIG. 3 is a sectional view through an alternator embodying the present invention taken and providing flux detail for a field coil energized in a second direction.

FIGS. 2 and 3 illustrate additional magnetic circuit features with the aid of the upper portion of the sectional view of FIG. 1, with new assumptions of a substantially null field coil excitation current and a field coil excitation current opposite to that of the forward excitation current, respectively. The latter excitation current is referred to herein as reverse excitation or reverse field.

Turning to FIG. 2, a substantially null field coil excitation current is assumed. Proceeding with such an assumption, any flux crossing the air gap between the rotor and stator originates with the permanent magnet 19B. Because of the proximity of the permanent magnet 19B to both the stator core 23 and the respective claw-pole finger 11B, a portion of the permanent magnet flux is now shunted through this low reluctance path. In essence, the stator core is utilized as a shunt path for a portion of the permanent magnet flux. This permanent magnet flux path during null field coil excitation advantageously reduces the emf generated in the output winding through the diversion of a portion of the flux to the magnetic material of the claw-pole members and advantageously reduces the iron losses due to the same flux diversion. This, of course, results in less drag on the vehicle engine and less iron loss induced heat generation. In practice, what has been referred to herein as null field coil excitation includes field excitation currents which result in mmf insufficient to drive the resultant field coil flux across the rotor/stator gap. A general representation of the flux pattern just described is shown by the arrow-headed lines in FIG. 2.

Turning to FIG. 3, a reverse field coil excitation current is assumed and results, in addition to the shunting just described, in even greater permanent magnet flux diversion away from the output winding since now the dipolar relationship between the claw-pole finger 11B (S) and the outer surface of the permanent magnet 19B (N) provides for an even lower effective reluctance path for the permanent magnet flux. Some of the permanent magnet flux continues to couple to the output winding to induce an emf therein. In order that the net emf of the output winding be reduced, the reverse excitation is increased which both diverts more permanent magnet flux away from the output winding and imparts a opposite mmf to the output winding to oppose that of the permanent magnet. Thus, when the emf in the output winding due to the remaining permanent magnet flux still coupled thereto is equal and opposite to the emf induced therein due to the reverse excitation field coil flux coupled thereto, the alternator output is null. The advantages of the present construction in this regard are that the reverse excitation requirements for null output are reduced due to the natural and forced flux diversions and reduced iron losses. All pairs of adjacent claw-pole fingers and pairs of adjacent permanent magnets have respective flux patterns generally following those immediately previously described. However, the pairs of axially aligned claw-pole fingers 11B and magnets 19B exhibit inherently less leakage flux outside of the desired shunt path as can be appreciated when examining the polar relationship between the PM carrier 18 in the locality of the permanent magnet 19B (S)

and the claw-pole member 13 (N). The polar attraction that these dipolar localities exhibit serve to advantageously thwart flux leakage outside of the desired shunt path. The adjacent pairs of axially aligned claw-pole fingers 13B and magnets 19A (see FIG. 1), however, exhibit inherently less desirable flux panels as can be appreciated by similar examination of the polar relationship between the PM carrier 18 in the locality of the permanent magnet 19A (N) and the claw-pole member 13 (N). The polar opposition that these homopolar localities exhibit serve to aid flux leakage into other paths ousted of the desired shunt path.

While the configuration shown in FIG. 1 provides high output power with simple control, and uses flux diversion by virtue of the intended proximal placement of the magnet carrier 18 to claw pole member 13 to minimize iron losses, it may still be desirable to reduce the leakage flux $F_L$. The leakage flux $F_L$ can be further reduced by employing an additional alternative configuration. Substitution of each magnet 19A that is in axial alignment with claw-pole fingers 13B with steel poles provides for such leakage reduction.. The configuration illustrated in FIG. 4 remains essentially as shown, however, with alternate placement of permanent magnet 19B and steel 19A poles. Those skilled in the art will recognize that the magnet mmf can be altered by choice of magnet material or redimensioning as desired. The leakage flux $F_L$ illustrated in FIG. 1 is greatly reduced since the local polarity influence of the formerly placed permanent magnet 19A is eliminated by the deletion of the magnet; the only local permanent magnet polarity influences remaining being homopolar with respect to claw-pole member 13 and coming from permanent magnets 19B.

Figure 6:
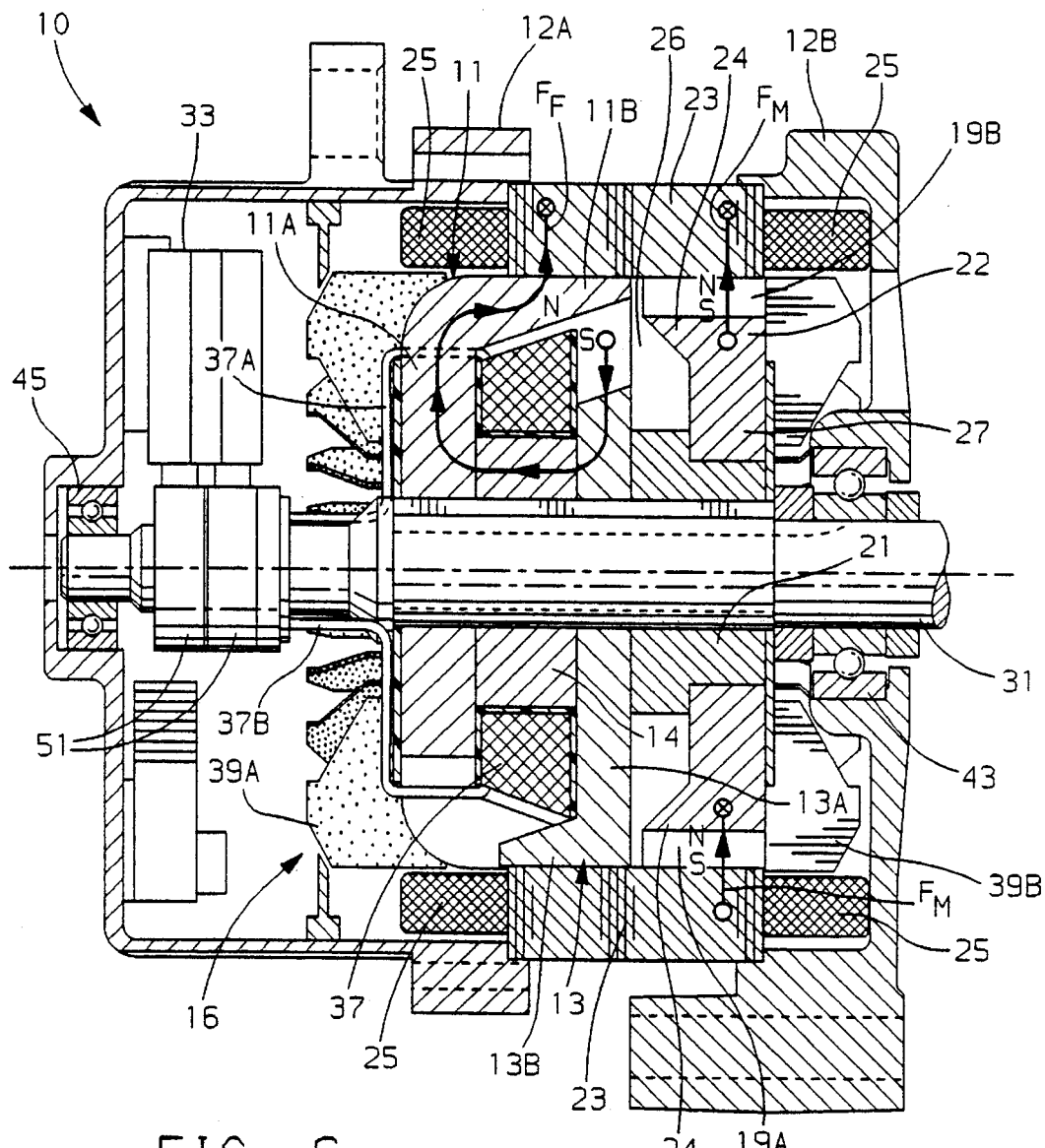
FIG. 6 is a sectional view taken along lines 1—1 of FIG. 4 through an exemplary alternator having another preferred structure and providing flux detail for a field coil energized in a first direction.

An alternative preferred embodiment of the present invention is now described with reference to FIG. 6 wherein like numerals correspond to like features previously described with reference to the various other figures. The field coil controlled rotor portion of the machine is identical to that shown and described with reference to various other figures and hence the description thereof shall not be repeated here. In contrast, however, the permanent magnet portion of the machine has bushing 21 fixedly coupled to the rotor shaft and is formed of a suitable non-magnetic material. Fixedly coupled to bushing 21 is a substantially annular hub 27 extending from bushing 21 and supporting PM carder 22. Hub 27 and PM carrier are both formed from a magnetic material such as steel. PM carder 22, hub 27 and bushing 21 are designed such that magnetic isolation is provided between the magnetic structures by the bushing 21 and the air space 26. By providing magnetic isolation between the PM carder 22 and the second claw-pole member, undesirable leakage flux path ($F_L$ in the embodiment shown in FIG. 1) is substantially reduced. Air space 26 additionally provides a cavity for air circulation. Although not shown in the illustration for the sake of clarity, it is further desirable that air circulation passages be formed through the hub portion 27 of the PM carder to reduce inertial mass and to provide for improved air circulation.

The PM carrier 22 preferably tapers toward the second claw-pole member near the outer perimeter forming a circumferentially continuous flange 24. This flange 24 has an axial dimension substantially equivalent to that of the permanent magnet 19A and 19B radially abutted thereto and is effective as a pole piece or flux concentrator for the pole of the radially inward pole of the permanent magnet. Flange 24 terminates axially to provide for an air gap between the claw-pole fingers and the permanent magnets 19A and 19B which are substantially aligned with the terminal edge. This air gap is intended to reduce the amount of permanent magnet flux leaking locally to a respective axially adjacent claw-pole finger thereby increasing the amount of permanent magnet flux coupled to the output winding during forward field. However, since it remains desirable to locate the magnets proximate to the claw-pole fingers to reduce the length of the flux diversion shunt paths using the inner periphery of the stator and various magnetic members of the rotor during null or reverse field, such a geometry as illustrated allows for substantial optimization of the desirable magnetic isolation of the body of the hub from the claw-pole member 13 while allowing a more proximal, yet still spaced, axial alignment of the permanent magnets with respective claw-pole fingers. An air gap of substantially 1 mm to 2 mm between the magnet end and the claw-pole fingers has provided acceptable performance in both these competing regards. Thus, the embodiment shown in FIG. 6 provides better utilization of magnet flux—though obtained at the expense of additional magnetic isolation components—while retaining flux control and flux diversion via the unitary field coil.

Figure 7:
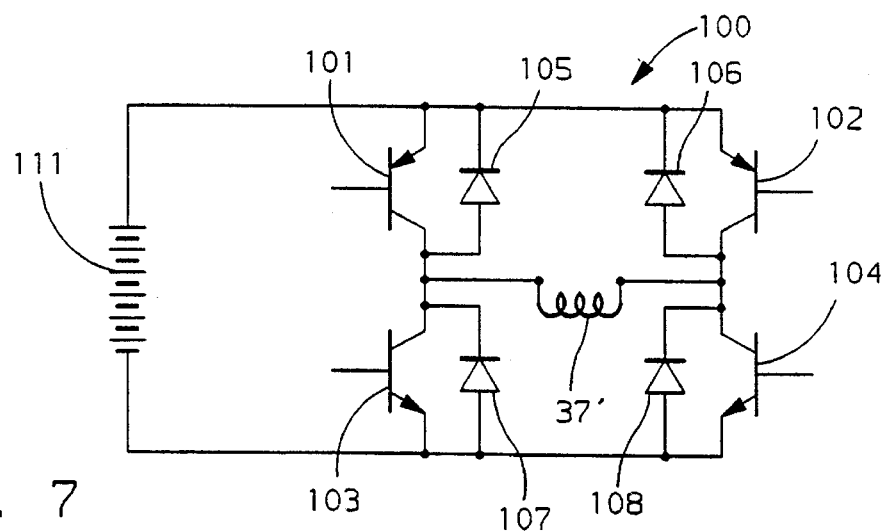
FIG. 7 is a schematic view of an exemplary field coil bi-directional energization circuit.

For the sake of completeness, FIG. 7 illustrates an exemplary circuit 100 for supplying bi-directional excitation current to the field coil of an alternator in accord with the present invention. A battery 111, such as a conventional 12 volt automotive battery, is shown as the primary excitation current source for the field coil 37. The skilled artisan will recognize of course that when the alternator is operating at less than full output, the system voltage across the battery provides the necessary excitation current. A first pair of power transistors 101 and 104 are associated with a first excitation current direction when commanded on and a second pair of power transistors 102 and 103 are associated with a second excitation current direction when commanded on. Free wheeling diodes 105–108 are shown coupled across respective power transistors 101–104 for managing well known inductive effects of the field coil. In the exemplary circuit, the various transistors can be modulated to adjust alternator output to compensate and regulate against load and speed changes as is conventionally practiced using well known techniques. An exemplary pulse width modulated controller is disclosed in U.S. Pat. No. 4,636,70 to Bowman et al. and is readily adaptable by one having ordinary skill in the art to provide bi-directional field current control in conjunction with the exemplary circuit 100 or other alternative circuits which are known.

While the preceding description sets forth certain preferred embodiments of the invention, it is to be understood that various alternatives will be apparent to those having ordinary skill in the art. Therefore, the embodiments contained herein are to be taken by way of example and not of limitation, the invention to be limited only by the claims as appended hereto.

I claim:

1. An alternating current generator comprising:

a housing;

a stator assembly supported by the housing including a stator core formed of magnetic material and carrying an output winding:

a rotor assembly including a shaft rotatably supported by said housing, said shaft having fixedly secured thereto first and second claw-pole members formed of magnetic material, each claw-pole member having a respective hub and a respective plurality of circumferentially spaced and axially extending claw-pole lingers, each claw-pole finger having a proximal end at the respective hub and a distal end remote therefrom, said first and second claw-pole members being so oriented on said shaft that the respective claw-pole fingers of said first and second claw-pole members are interleaved such that the distal ends of the claw-pole fingers of the first claw-pole member are in substantial planar alignment with the proximal ends of the claw-pole fingers of the second claw-pole member, a field coil axially intermediate said claw-pole members, a permanent magnet carrier including a hub portion carrying a circumferentially continuous flange in axial extension toward said second claw-pole member, a non-magnetic bushing fixedly coupling said permanent magnet carrier to said shaft, said permanent magnet carrier having a plurality of radially magnetized permanent magnets at an outer periphery of the flange, adjacent ones of said plurality of permanent magnets having opposite magnetic polarity, each of said plurality of permanent magnets being axially aligned with a respective claw-pole finger, each of said plurality of permanent magnet further being spaced axially from the respective axially adjacent claw-pole finger such that the spacing of the hub portion to the second claw-pole member is greater than the spacing of the plurality of permanent magnets to the second claw-pole member; and said field coil bi-directionally energizable to establish first and second magnetic polarities of said claw-pole members, said first magnetic polarity establishing magnetically homopolar pairs of axially aligned claw-pole lingers and permanent magnets, and said second magnetic polarity establishing magnetically dipolar pairs of axially aligned claw-pole fingers and permanent magnets.

2. An alternating current generator as claimed in claim 1 wherein said permanent magnets comprise permanently magnetized portions of said permanent magnet carrier.

* * * * *